(12) United States Patent
Mukai

(10) Patent No.: US 11,445,090 B2
(45) Date of Patent: Sep. 13, 2022

(54) INFORMATION PROCESSING APPARATUS, INFORMATION PROCESSING SYSTEM, AND INFORMATION PROCESSING METHOD FOR EXECUTING APPLICATIONS ON WHICH USE PERMISSION IS GRANTED

(71) Applicant: Kyohhei Mukai, Kanagawa (JP)

(72) Inventor: Kyohhei Mukai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/340,304

(22) Filed: Jun. 7, 2021

(65) Prior Publication Data

US 2022/0006920 A1    Jan. 6, 2022

(30) Foreign Application Priority Data

Jul. 6, 2020   (JP) .............................. JP2020-116703

(51) Int. Cl.
*H04N 1/44*    (2006.01)
*H04N 1/00*    (2006.01)

(52) U.S. Cl.
CPC ......... *H04N 1/4433* (2013.01); *H04N 1/0048* (2013.01); *H04N 1/00925* (2013.01); *H04N 1/00938* (2013.01); *H04N 1/00936* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 7,256,902 B1* | 8/2007 | Morikawa | G03G 15/5083 358/1.14 |
| 2008/0204796 A1* | 8/2008 | Kitamura | G06F 21/608 358/1.15 |
| 2012/0162713 A1* | 6/2012 | Minamiyama | G06F 3/1257 358/1.15 |
| 2013/0159021 A1* | 6/2013 | Felsher | G16H 10/60 705/3 |
| 2015/0150130 A1* | 5/2015 | Fiala | G06F 21/56 726/23 |
| 2016/0125713 A1* | 5/2016 | Blech | G08B 13/187 348/143 |

FOREIGN PATENT DOCUMENTS

| | | |
|---|---|---|
| JP | 2017-058834 | 3/2017 |
| JP | 2018-140543 | 9/2018 |

\* cited by examiner

*Primary Examiner* — Haris Sabah
(74) *Attorney, Agent, or Firm* — IPUSA, PLLC

(57) ABSTRACT

An information processing apparatus, an information processing system, and an information processing method. The information processing apparatus executes at least one of a plurality of applications for which use permission is granted in units of package, and in response to an invalidation of the use permission, display on a display, a notification indicating the invalidation of the use permission.

11 Claims, 11 Drawing Sheets

INFORMATION PROCESSING APPARATUS, INFORMATION PROCESSING SYSTEM, AND INFORMATION PROCESSING METHOD FOR EXECUTING APPLICATIONS ON WHICH USE PERMISSION IS GRANTED

CROSS-REFERENCE TO RELATED APPLICATIONS

This patent application is based on and claims priority pursuant to 35 U.S.C. § 119(a) to Japanese Patent Application No. 2020-116703, filed on Jul. 6, 2020 in the Japan Patent Office, the entire disclosure of which is hereby incorporated by reference herein.

BACKGROUND

Technical Field

The present disclosure relates to an information processing apparatus, an information processing system, and an information processing method.

Related Art

When a problem occurs in an information processing apparatus to which application use permission is granted, a configuration is disclosed that allows use of an application by another information processing apparatus to which application use permission is not granted.

SUMMARY

Embodiments of the present disclosure describe an information processing apparatus, an information processing system, and an information processing method. The information processing apparatus executes at least one of a plurality of applications for which use permission is granted in units of package, and in response to an invalidation of the use permission, display on a display, a notification indicating the invalidation of the use permission.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
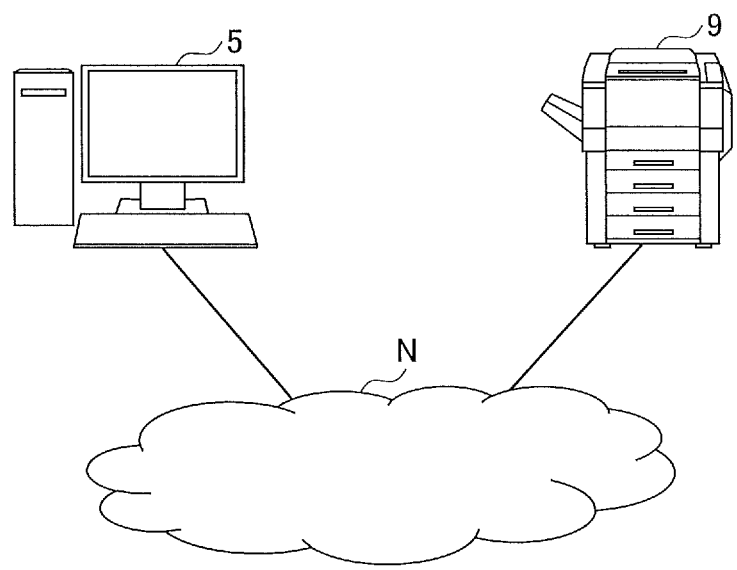
FIG. 1 is a diagram illustrating a configuration example of an information processing system according to embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a," "an," and "the" are intended to include the plural forms as well, unless the context clearly indicates otherwise.

Hereinafter, a description is given of several embodiments of the present disclosure with reference to the drawings. In each drawing, the same components are designated by the same reference numerals, and duplicate description is omitted as appropriate. The embodiments described below exemplify an information processing apparatus for embodying the technical idea of the present disclosure, and the present disclosure is not limited to the embodiments described below.

The information processing apparatus according to the present embodiment is an information processing apparatus capable of executing a plurality of applications to which use permission is granted in units of packages. Further, in the present embodiment, when the use permission is expired, a notification indicating the expiration of the use permission is displayed to notify the user or the administrator of the information processing apparatus of the expiration, making it possible to appropriately manage the use permission of applications to which use permission is granted for each package.

Terms used in the present disclosure are as follows.

"Application" is a software program selectively used according to a specific purpose.

A "package" is a group (or a unit) of multiple application programs to be provided at once. The application according to the embodiment is sold and provided with use permission in units of package. An example of a package is a collection of multiple applications that are useful depending on a type of business or operation and provided as a business type package. Another example of a package is a collection of multiple applications related to a specific function such as a reading function and a printing function and provided as a function package.

"Use permission" refers to authority to use the application. The use permission is also called a license. The use permission may be given to the information processing apparatus, a specific user who uses the information processing apparatus, a specific administrator who manages the information processing apparatus, a specific group of users who use the information processing apparatus, and the like.

"Invalidation of use permission" indicates that use permission expires or is withdrawn, and valid use permission became invalid. For example, the use permission is invalidated when a contract validity period exceeded or when price for the package subject to the contract is not paid.

Hereinafter, an embodiment is described by taking an information processing system including an image forming apparatus (an example of an information processing apparatus) as an example.

A configuration of an information processing system 1 is described with reference to FIG. 1. FIG. 1 is a diagram illustrating an example of the configuration of the information processing system 1. As illustrated in FIG. 1, the information processing system 1 includes a contract management server 5 and an image forming apparatus 9. The contract management server 5 and the image forming apparatus 9 are communicably connected through a network N such as the internet.

The information processing system 1 is a system that can use a plurality of applications to which use permission is granted in units of package. The applications are purchased in units of package. A purchased package is downloaded from an application site provided in a cloud server or the like, and then a plurality of applications included in the package are installed in the image forming apparatus 9. The application use permission is granted in units of package, and the application can be used by the image forming apparatus 9 based on the use permission.

Further, the information processing system 1 provides an application by a subscription method. The subscription method is one of payment methods to purchase the application and is a method in which the application can be used during the contract period as long as a usage fee is continuously paid on a regular basis. The usage of each application included in the package is controlled according to a monthly billing status.

In the information processing system 1, the application included in the package can be used only when the use permission is valid. The information processing system 1 performs a process of authenticating whether the use permission is valid at once when a launcher application (described below) included in the package is first started after the package is purchased (after the contract is made). When the authentication is successful, any application included in the package will be available without any authentication process.

However, after the above authentication is successful, the use permission may be invalidated due to an expiration of the contract period or insufficient monthly billing. In this case, since the authentication process is no longer performed as described above, the application may be available even though the use permission is invalidated.

In the present embodiment, after successful authentication, a process of determining whether the use permission has been invalidated (hereinafter, referred to as an invalidation determination process) is executed at night at the beginning of each month. Further, in case the image forming apparatus 9 is turned off at night at the beginning of the month, the invalidation determination process may be executed when the image forming apparatus 9 is started for the first time at the beginning of the month.

In response to a determination that the use permission is invalidated, the image forming apparatus 9 disables the use of the application included in the package and displays a notification indicating that the use permission has been invalidated on a display unit such as an operation panel included in the image forming apparatus 9.

As a result, usage of the application included in the package whose use permission has expired is prevented and the use permission of the application is properly managed. In the present embodiment, the beginning of each month is exemplified as the time to execute the invalidation determination process, but the present disclosure is not limited to this example. The time to execute the invalidation determination process, such as the end of the month, the beginning of the week, the weekend, the beginning of every other month, or the weekend of every other week, can be set as appropriate, and may not be performed regularly. Further, execution of the invalidation determination process is not limited to nighttime and the invalidation determination process may be executed at a time other than nighttime.

The contract management server 5 of FIG. 1 is an example of a contract information management device that manages contract information for each package. The contract management server 5 is implemented by an information processing apparatus such as a computer installed with a general operating system (OS) or the like and includes a wireless communication device or a wired communication device.

The contract management server 5 manages contract information of each of the plurality of packages and sets availability of the application based on the contract information. The contract information of the package is information related to the contract concluded at the time of purchasing the package, such as an expiration date of the contract of the package, a contract type (monthly contract, annual contract, etc.), a fee, a payment method of the fee, and a type of the application included in the package.

The image forming apparatus 9 of FIG. 1 is an example of an information processing apparatus capable of executing a plurality of applications to which use permission is granted in units of package. The image forming apparatus 9 is an apparatus including an image forming function such as a multifunction peripheral/product/printer (MFP) and includes a wireless communication device or a wired communication device. The image forming apparatus 9 executes processing related to image forming of the MFP, a copier, a scanner, a printer, a laser printer, a projector, an electronic whiteboard, and the like.

Although FIG. 1 illustrates an information processing system 1 including one image forming apparatus 9 as an example, the information processing system 1 may include a plurality of image forming apparatuses 9 that can communicate with each other through the network N. The information processing system 1 may be configured so that other apparatuses such as an external server and a personal computer (PC) are connected to the network N and can communicate with each other through the network N.

In the present embodiment, the image forming apparatus 9 as an example of the information processing apparatus is described, but the present disclosure is not limited this example. The information processing apparatus is an apparatus equipped with a communication function and includes, for example, an output device such as a projector (PJ), an interactive white board (a white board having an electronic whiteboard function capable of mutual communication (IWB)), a digital signage, a head up display (HUD) device, an industrial machine, an imaging device, a sound collecting device, a medical device, a network home appliance, an automobile (connected car), a notebook PC, a mobile phone, a smartphone, a tablet terminal, a game console, a personal digital assistant (PDA), a digital camera, a wearable PC, and a desktop PC.

Figure 2:
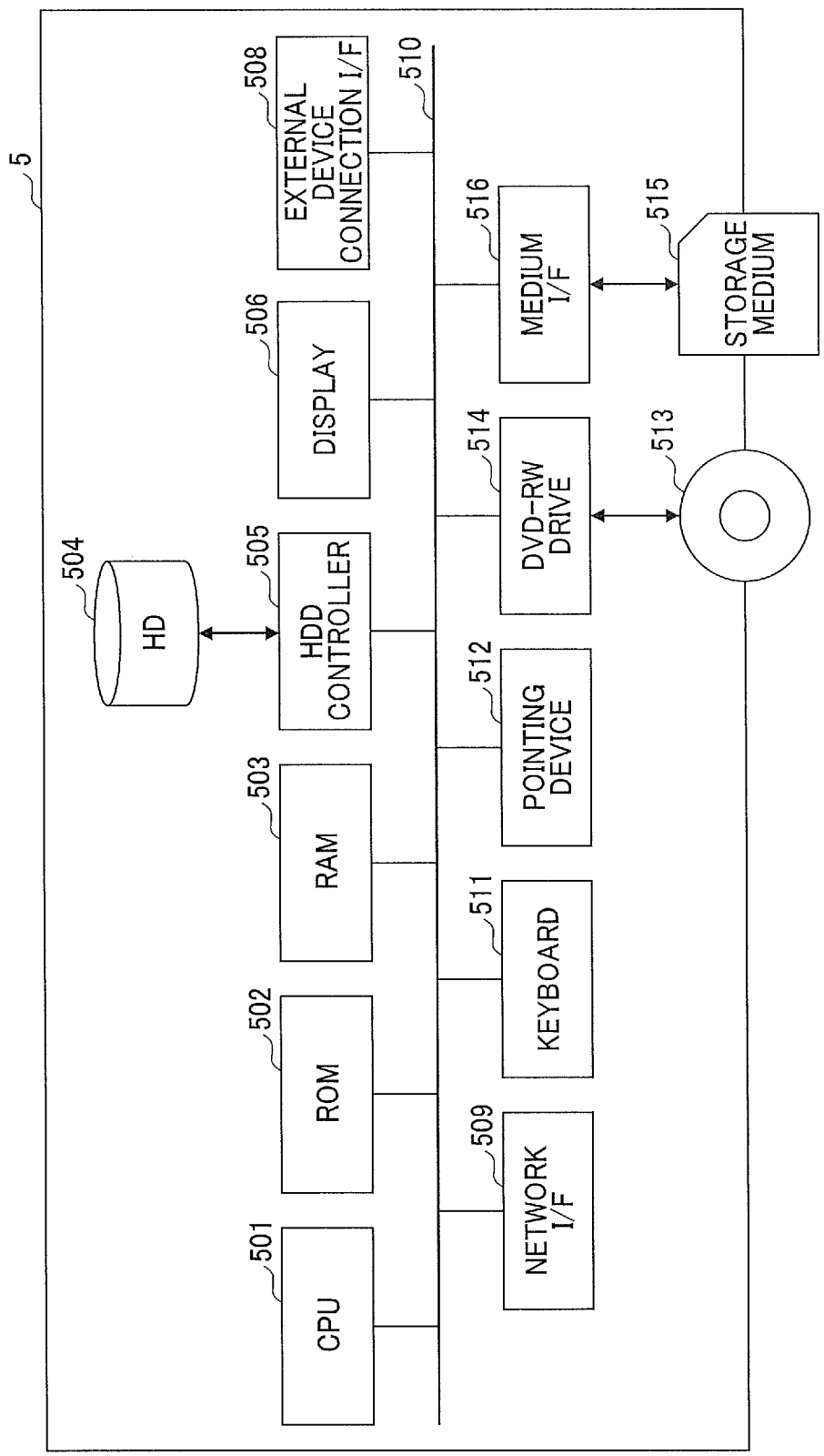
FIG. 2 is a block diagram illustrating an example of a hardware configuration of a contract management server according to embodiments of the present disclosure.

A hardware configuration of the contract management server 5 is described below with reference to FIG. 2. FIG. 2 is a block diagram illustrating an example of the hardware configuration of the contract management server 5.

As illustrated in FIG. 2, the contract management server 5 includes a central processing unit (CPU) 501, a read only memory (ROM) 502, a random access memory (RAM) 503, a hard disc (HD) 504, and a hard disc drive (HDD) controller 505. In addition, a display 506, an external device connection interface (I/F) 508, a network I/F 509, a data bus 510, a keyboard 511, a pointing device 512, a digital versatile disk rewritable (DVD-RW) drive 514, and a medium I/F 516 are included.

Among these elements, the CPU 501 controls an operation of the entire contract management server 5. The ROM 502 stores programs such as an initial program loader (IPL) used for driving the CPU 501. The RAM 503 is used as a work area for the CPU 501.

The HD 504 stores various data such as programs. The HDD controller 505 controls reading and writing of various data from and to the RD 504 under control of the CPU 501. The display 506 displays various information such as cursors, menus, windows, characters, or images.

The external device connection I/F 508 is an interface for connecting various external devices. The external device in this case is a universal serial bus (USB) memory, a printer, or the like. The network I/F 509 is an interface for performing data communication using the network N. The data bus 510 is an address bus, a data bus, or the like for electrically connecting each element such as the CPU 501.

The keyboard 511 is one example of an input device provided with a plurality of keys for enabling a user to input characters, numerals, or various instructions. The pointing device 512 is an example of an input device that allows a user to select or execute a specific instruction, select a target for processing, or move a cursor being displayed.

The DVD-RW drive 514 reads and writes various data from and to a DVD-RW 513, which is an example of a removable storage medium. The removable storage medium is not limited to the DVD-RW and may be a digital versatile disc-recordable (DVD-R) or the like. The medium I/F 516 controls reading or writing (storage) of data to a storage medium 515 such as a flash memory.

Figure 3:
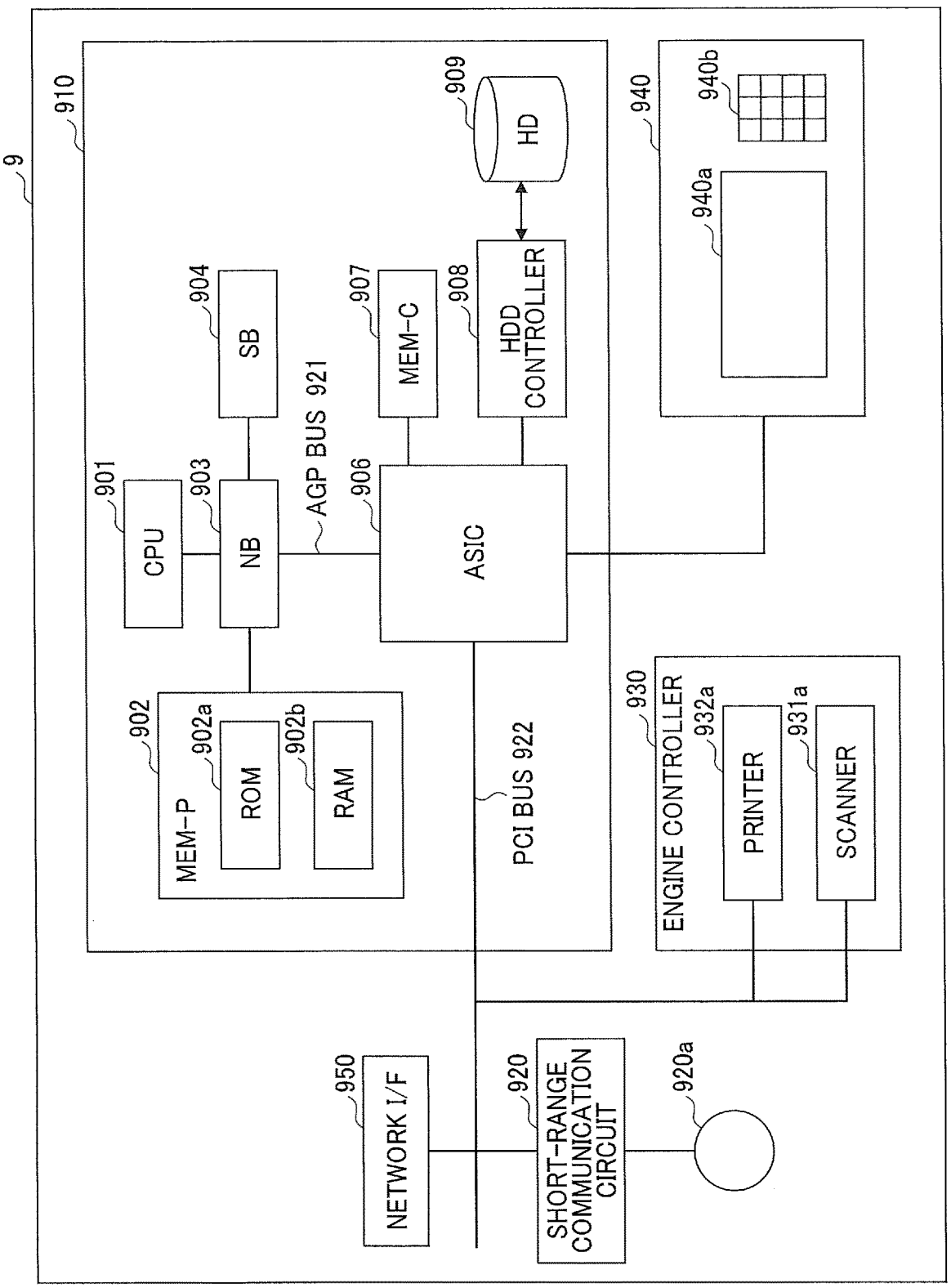
FIG. 3 is a block diagram illustrating an example of a hardware configuration of an image forming apparatus according to embodiments of the present disclosure.

A hardware configuration of the image forming apparatus 9 is described below with reference to FIG. 3. FIG. 3 is a block diagram illustrating an example of the hardware configuration of the image forming apparatus 9.

As illustrated in FIG. 3, the image forming apparatus 9 includes a controller 910, a short-range communication circuit 920, an engine controller 930, a control panel 940, and a network I/F 950.

The controller 910 includes a CPU 901 as a main processor of the computer, a system memory (MEM-P) 902, a north bridge (NB) 903, a south bridge (SB) 904, an application specific integrated circuit (ASIC) 906, a local memory (MEM-C) 907 as a storage unit, an HDD controller 908, and an HD 909 as a storage unit. The NB 903 and the ASIC 906 are connected through an Accelerated Graphics Port (AGP) bus 921.

The CPU 901 is a processor that performs overall control of the image forming apparatus 9. The NB 903 is a bridge for connecting the CPU 901, the MEM-P 902, the SB 904, and the AGP bus 921, and includes a memory controller that controls reading and writing to the MEM-P 902, a Peripheral Component Interconnect (PCI) master, and an AGP target.

The MEM-P 902 includes a ROM 902*a* as a memory that stores program and data for implementing various functions of the controller 910 and further includes a RAM 902*b* as a memory that deploys the program and data, or as a drawing memory that stores drawing data for printing.

The program stored in the ROM 902*a* may be stored in any computer-readable storage medium, such as a compact disc-read only memory (CD-ROM), compact disc-recordable (CD-R), or digital versatile disc (DVD), in a file format installable or executable by the computer for distribution.

The SB 904 connects the NB 903 with a peripheral component interconnect (PCI) device or a peripheral device. The ASIC 906 is an integrated circuit (IC) dedicated to an image processing use, and connects the AGP bus 921, a PCI bus 922, the HDD controller 908, and the MEM-C 907.

The ASIC 906 is a PCI target and an AGP master, an arbiter (ARB) that forms the core of the ASIC 906, a memory controller that controls the MEM-C 907, and a plurality of DMACs (Direct Memory Access Controllers) that rotate image data by hardware logic and the like, and a PCI unit that transfers data between a scanner 931*a* and a printer 932*a* through the PCI bus 922.

A USB interface or an Institute of Electrical and Electronics Engineers 1394 (IEEE 1394) interface may be connected to the ASIC 906.

The MEM-C 907 is a local memory used as a buffer for image data to be copied or a code buffer. The HD 909 is a storage for storing image data, font data used during printing, and forms. The HDD controller 908 controls reading or writing of data to the HD 909 according to the control of the CPU 901.

The AGP bus 921 is a bus interface for a graphics accelerator card proposed for speeding up graphics processing. The AGP bus 921 directly accesses the MEM-P 902 with high throughput to accelerate the graphics accelerator card.

The short-range communication circuit 920 includes a short-range communication antenna 920*a*. The short-range communication circuit 920 is a communication circuit such as Near Field Communication (NFC) or BLUETOOTH (registered trademark).

Further, the engine controller 930 includes the scanner 931*a* and the printer 932*a*. The control panel 940 also includes a display panel 940*a* and an operation panel 940*b*. The display panel 940*a* displays a current set value, a selection screen, or the like, and is provided with a touch panel or the like that receives input from an operator such as a user or an administrator of the image forming apparatus 9. Further, the operation panel 940*b* includes a numeric keypad that accepts setting values of conditions related to image formation such as density setting conditions, a start key that accepts a copy start instruction, and the like.

The controller 910 controls entire operation of the image forming apparatus 9. For example, the controller 910 controls rendering, communication, or user inputs to the control panel 940. The scanner 931a and the printer 932a each performs various image processing, such as error diffusion or gamma conversion.

In response to an instruction to select a specific application through the control panel 940, for example, using a mode switch key, the image forming apparatus 9 selectively performs a document box function, a copy function, a print function, and a facsimile function.

The document box mode is selected when the document box function is selected, the copy mode is selected when the copy function is selected, the printer mode is selected when the printer function is selected, and the facsimile mode is selected when the facsimile function is selected.

The network I/F 950 is an interface for performing data communication using the network N. The short-range communication circuit 920 and the network I/F 950 are electrically connected to the ASIC 906 through the PCI bus 922.

Figure 4:
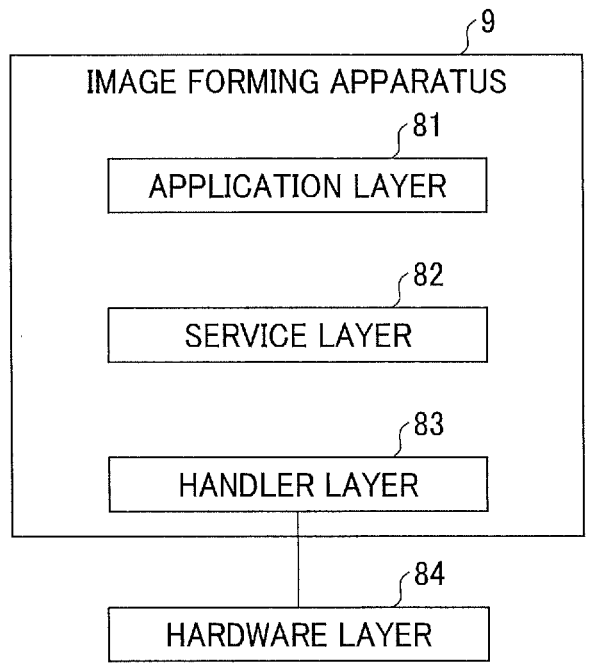
FIG. 4 is a block diagram illustrating an example of a software configuration of the image forming apparatus according to embodiments of the present disclosure.

A software configuration of the image forming apparatus 9 is described with reference to FIG. 4. FIG. 4 is a block diagram illustrating an example of the software configuration of the image forming apparatus 9. As illustrated in FIG. 4, the image forming apparatus 9 includes an application layer 81, a service layer 82, and a handler layer 83.

The entities of the application layer 81, the service layer 82, and the handler layer 83 are various software stored in the ROM 902a, the local memory (MEM-C) 907, or the like. Various functions are provided by the CPU 901 executing the software. The hardware layer 84 correspond to the hardware resources included in the image forming apparatus 9. The service layer 82, the handler layer 83, and the hardware layer 84 are collectively referred to as a platform.

The software of the application layer 81 is an application or the like for operating a hardware resource belonging to the hardware layer 84 to provide certain function. The function of the application is performed in response to receiving an instruction or a setting request from the user or the administrator of the image forming apparatus 9 through the control panel 940 and making a request to the platform. Examples of the application include a copy application for providing a copy function, a scan application for providing a scan function, a fax application for providing a fax function, a print application for providing a print function, and the like.

The software of the service layer 82 is software that intervenes between the application layer 81 and the handler layer 83 and provides the application with an interface for using the hardware resources included in the image forming apparatus 9. More specifically, the software of the service layer 82 provides the functions of receiving and mediating the operation request to the hardware resources. Examples of the operation request received by the service layer 82 include a request for reading by the scanner 931a and a request for printing by the printer 932a. The interface function of the service layer 82 is provided by web application programming interface (API) or the like.

The software of the handler layer 83 is basic software for providing a basic function of controlling hardware resources included in the image forming apparatus 9. The software of the service layer 82 converts the usage request of the hardware resource from various applications into a command that can be interpreted by the handler layer 83 and passes the command to the handler layer 83. Then, when the command is executed by the software of the handler layer 83, the hardware resource operates according to the request of the application.

The operations executed by the software of the handler layer 83 include control of data storage and data retrieval of MEM-P 902, control of data storage and data retrieval of HD 909, control of scanner 931a, and control of printer 932a.

Figure 5:
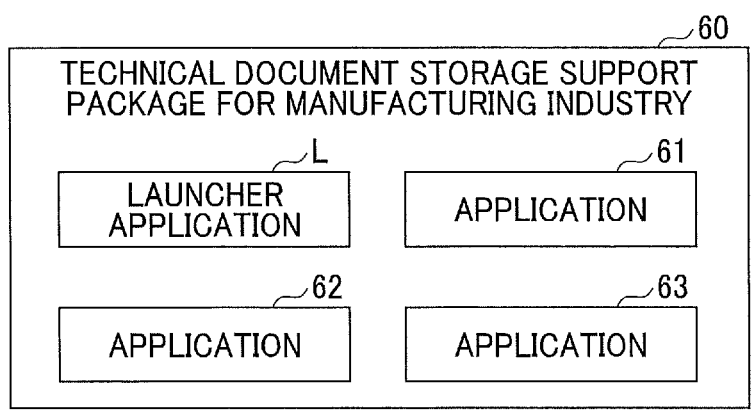
FIG. 5 is a block diagram illustrating an example of a configuration of a package according to embodiments of the present disclosure.

A configuration of the package is described below. FIG. 5 is a block diagram illustrating an example of a package configuration. As illustrated in FIG. 5, the package 60 is a technical document storage support package for the manufacturing industry, which includes a launcher application L and applications 61, 62, and 63.

The launcher application L is an application that displays a launcher screen (home screen) that displays a list of icons of a plurality of applications included in the package on the control panel 940 (refer to FIG. 3).

The application 61 is, for example, a simple document utilization application. The simple document utilization application efficiently reads and digitizes paper documents with the image forming apparatus 9, integrates and manages the digitized documents in-house, checks the digitized documents from outside, and shares the digitized documents with business partners.

The application 62 is, for example, a ScanToMe application. The ScanToMe application is an application that sends a document read by the image forming apparatus 9 to an email address of the user or the administrator of the image forming apparatus 9 registered in the address book.

The application 63 is, for example, a mixed size scan application. The mixed size scan application is an application that reads a plurality of documents having different sizes at once by the image forming apparatus 9 and makes the read documents into one document.

The technical document storage support package for the manufacturing industry illustrated in FIG. 5 is an example, and various packages can be configured by including various applications depending on the application. The number of applications included in the package is not limited to four and may be any number.

Figure 6:
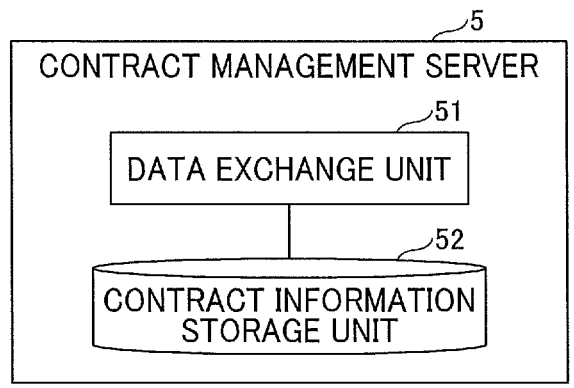
FIG. 6 is a block diagram illustrating an example of a functional configuration of the contract management server according to embodiments of the present disclosure.

A functional configuration of the contract management server 5 is described below with reference to FIG. 6. FIG. 6 is a block diagram illustrating an example of the functional configuration of the contract management server 5 according to the present embodiment.

As illustrated in FIG. 6, the contract management server 5 includes a data exchange unit 51 and a contract information storage unit 52. Among these units, the function of the data exchange unit 51 is implemented by the network I/F 509 (see FIG. 2) or the like, and the function of the contract information storage unit 52 is implemented by the HD 504 or the like.

The data exchange unit 51 includes a function of transmitting and receiving information to and from the image forming apparatus 9. The data exchange unit 51 can also transmit and receive information to and from an external device other than the image forming apparatus 9.

The contract information storage unit 52 stores the contract information of each of the plurality of packages. Further, in response to the transmission request of the contract information of the package from the image forming apparatus 9, the contract information of the package corresponding to the transmission request is transmitted to the image forming apparatus 9 through the data exchange unit 51.

Figure 7:
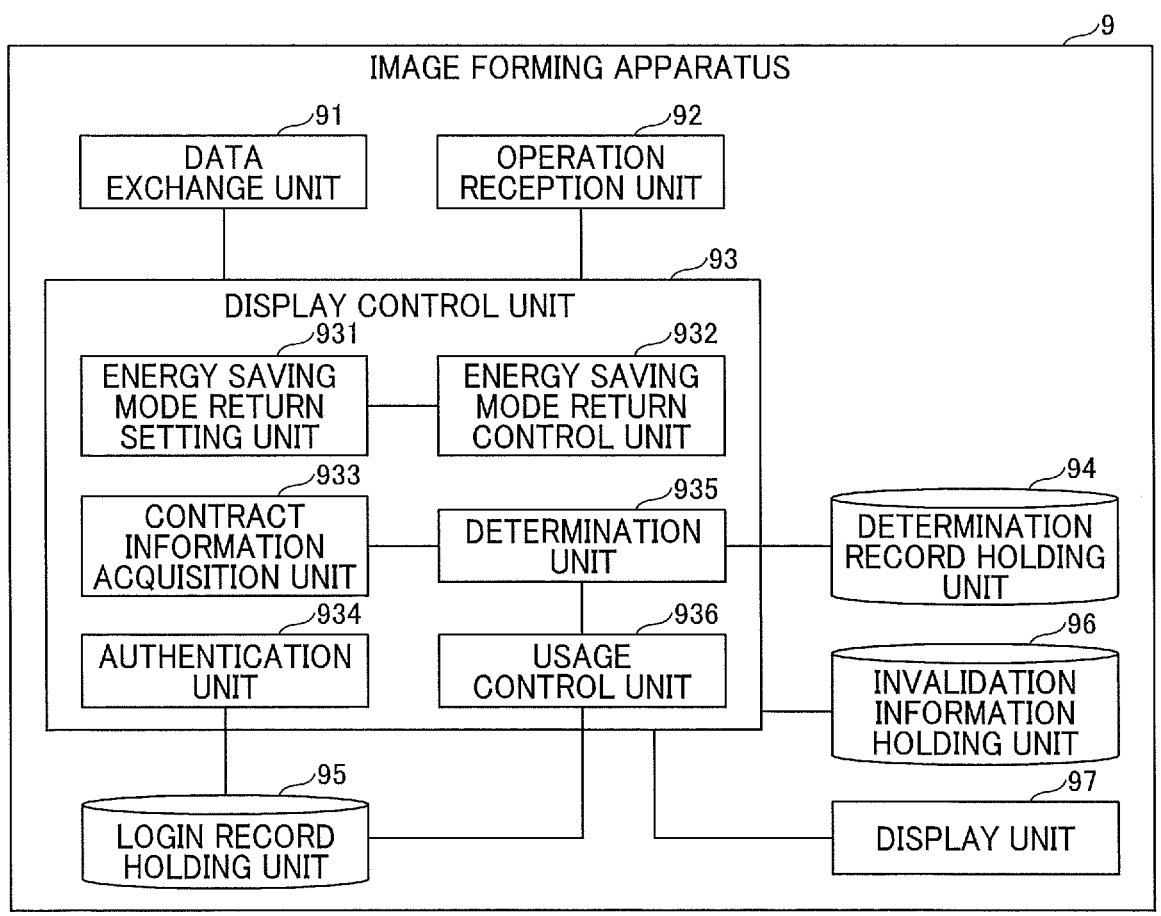
FIG. 7 is a block diagram illustrating an example of a functional configuration of the image forming apparatus according to embodiments of the present disclosure.

A functional configuration of the image forming apparatus 9 is described with reference to FIG. 7. FIG. 7 is a block diagram illustrating an example of the functional configuration of the image forming apparatus 9.

As illustrated in FIG. 7, the image forming apparatus 9 includes a data exchange unit 91, an operation reception unit 92, a display control unit 93, a determination record holding unit 94, a login record holding unit 95, an invalidation information holding unit 96, and a display unit 97. Among these units, function of the data exchange unit 91 is implemented by the network I/F 950 (refer to FIG. 3) or the like, and function of the operation reception unit 92 is implemented by the display panel 940a, the operation panel 940b or the like. The function of the display control unit 93 is implemented by the CPU 901 executing the launcher application L or the like. Each function of the determination record holding unit 94, the login record holding unit 95, and the invalidation information holding unit 96 is implemented by the HD 909 or the like, and the function of the display unit 97 is implemented by the display panel 940a or the like.

The data exchange unit 91 includes a function of transmitting and receiving information to and from the contract management server 5. The data exchange unit 91 can also transmit and receive information to and from an external device other than the contract management server 5. The operation reception unit 92 receives an operation on the image forming apparatus 9 by an operator such as the user or the administrator of the image forming apparatus 9. Examples of the operation on the image forming apparatus 9 include a touch operation on the icon displayed on the display panel 940a.

The display control unit 93 causes the display unit 97 to display a list of a plurality of applications to which the use permission is granted in units of package. Specifically, a launcher screen including a list of icons of applications 61, 62, and 63 is displayed on the control panel 940. The display control unit 93 includes an energy saving mode return setting unit 931, an energy saving mode return control unit 932, a contract information acquisition unit 933, an authentication unit 934, a determination unit 935, and a usage control unit 936.

The energy saving mode return setting unit 931 and the energy saving mode return control unit 932 are functional units used when an operation mode of the image forming apparatus 9 is returned from an energy saving mode to a normal mode. The energy saving mode refers to an operation mode in which some functions or operations of the image forming apparatus 9 are restricted in order to reduce power consumption of the image forming apparatus 9. The normal mode is an operation mode in which function or operation is not restricted.

Among these units, the energy saving mode return setting unit 931 sets return time for returning the image forming apparatus 9 from the energy saving mode to the normal mode. As an example, in the case of the image forming apparatus 9 in which the power is on for 24 hours, the return time at 15-minute intervals can be set in the nighttime zone from 2:15 am to 7:00 am.

The energy saving mode return control unit 932 receives a return command from the image forming apparatus 9 at the return time set by the energy saving mode return setting unit 931 and returns the operation mode of the image forming apparatus 9 from the energy saving mode to the normal mode. As a result, the image forming apparatus 9 is in a state where the invalidation determination process can be executed.

The contract information acquisition unit 933 transmits information indicating a package for which contract information is to be acquired to the contract management server 5 through the data exchange unit 91. Further, the contract information acquisition unit 933 receives and acquires through the data exchange unit 91, the contract information of the package transmitted by the contract management server 5 in response to the information indicating the package.

The authentication unit 934 executes a process of authenticating whether the use permission is valid once when the launcher application L included in the package is first started after the package is purchased (after the contract is concluded).

For example, the authentication unit 934 causes the display unit 97 to display a login screen and receives authentication information such as an email address and a password from the user or the administrator of the image forming apparatus 9. Based on the authentication information and the contract information of the package acquired from the contract information acquisition unit 933, it is possible to authenticate whether the use permission is valid.

In response to successful authentication, the authentication unit 934 causes the login record holding unit 95 to hold information indicating that the user or the administrator has been logged in (authenticated) to the package. As a result, it is possible to determine that the user has already logged in by referring to the login record holding unit 95. Therefore, the authentication unit 934 does not have to execute the authentication process as long as the application use permission is valid.

After successful authentication, the determination unit 935 executes the invalidation determination process of the application included in the package based on the contract information of the package acquired by the contract information acquisition unit 933 at the night of the beginning of each month. Further, since the invalidation determination process cannot be executed when the power of the image forming apparatus 9 is off at night at the beginning of the month, the invalidation determination process may be performed when the image forming apparatus 9 is started for the first time at the beginning of the month.

For example, the determination unit 935 compares a contract validity period included in the contract information of the package with the current date and time, and when the current date and time has passed the expiration date of the contract validity period, determines that the use permission is invalid. On the contrary, when the current date and time does not exceed the expiration date of the contract validity period, the determination unit 935 determines that the use permission is valid. Alternatively, when the billing status of the fee for the package is not appropriate (that is, indicating that the fee is not paid), the determination unit 935 determines that the use permission is invalid, and when the billing status is appropriate (that is, indicating that the fee is paid), the determination unit 935 determines that the use permission is valid.

Further, the determination unit 935 causes the determination record holding unit 94 to hold the information indicating that the invalidation determination has been completed for the package after the invalidation determination process is performed at the night of the beginning of the month. As a result, by referring to the determination record holding unit 94, it is possible to determine that the invalidation determination has been completed in that month. Therefore, during that month, the determination unit 935 does not have to execute the invalidation determination process. The determination unit 935 deletes the information indicating that the invalidation determination has been completed when the month changes. As a result, the determination unit 935 executes the invalidation determination process again at night at the beginning of the next month.

The invalidation determination process can be executed at any time such as at the end of the month, the beginning of the week, the weekend, the beginning of every other month, or the weekend of every other week. The invalidation determination process does not have to be executed regularly. However, it is preferable to periodically execute the invalidation determination process in order to detect the invalidation for sure. Further, it is preferable that the period for executing the invalidation determination process is shortened because invalidation can be detected in a timely manner without leaving a time after the invalidation. On the other hand, it is preferable that the period for executing the invalidation determination process is lengthened because the number of times the invalidation determination process is executed can be reduced and the processing load can be reduced.

In addition, the invalidation determination process can be executed at time other than nighttime such as daytime. However, since the use of the image forming apparatus 9 is restricted while the invalidation determination process is being executed, it is preferable to execute the invalidation determination process at night when the image forming apparatus 9 is used less frequently than during the daytime when the image forming apparatus 9 is used frequently.

As a result of the invalidation determination process, the usage control unit 936 disables the use of the application when it is determined that the use permission is invalid.

For example, the usage control unit 936 returns the application to a state before successful authentication (before login) by clearing the information of the login record holding unit 95. As a result, even when the user or the administrator of the image forming apparatus 9 tries to use the application, the authentication by the authentication unit 934 is not successful, and the use of the application is rejected.

The display control unit 93 causes the display unit 97 to display a notification indicating that the use permission is invalid. However, when the use permission expires at night, the user or administrator of the image forming apparatus 9 cannot see the display even if the notification indicating that the use permission is invalid is displayed. Therefore, the display control unit 93 temporarily causes the invalidation information holding unit 96 to hold the notification indicating that the use permission is invalid and the notification is displayed on the display unit 97 at the next time when an operator such as a user or an administrator of the image forming apparatus 9 performs an operation on the launcher application L. Further, when the use permission is invalidated, the display control unit 93 cancels the setting of the return command from the energy saving mode by the image forming apparatus 9 to disable the invalidation determination process.

The display unit 97 displays the notification indicating that the use permission is invalid under the control of the display control unit 93. It is preferable that the display unit 97 displays the login screen together with the notification indicating that the use permission is invalid, since the display unit 97 can clearly notify the user or administrator of the image forming apparatus 9 that the use permission is invalid.

Figure 8:
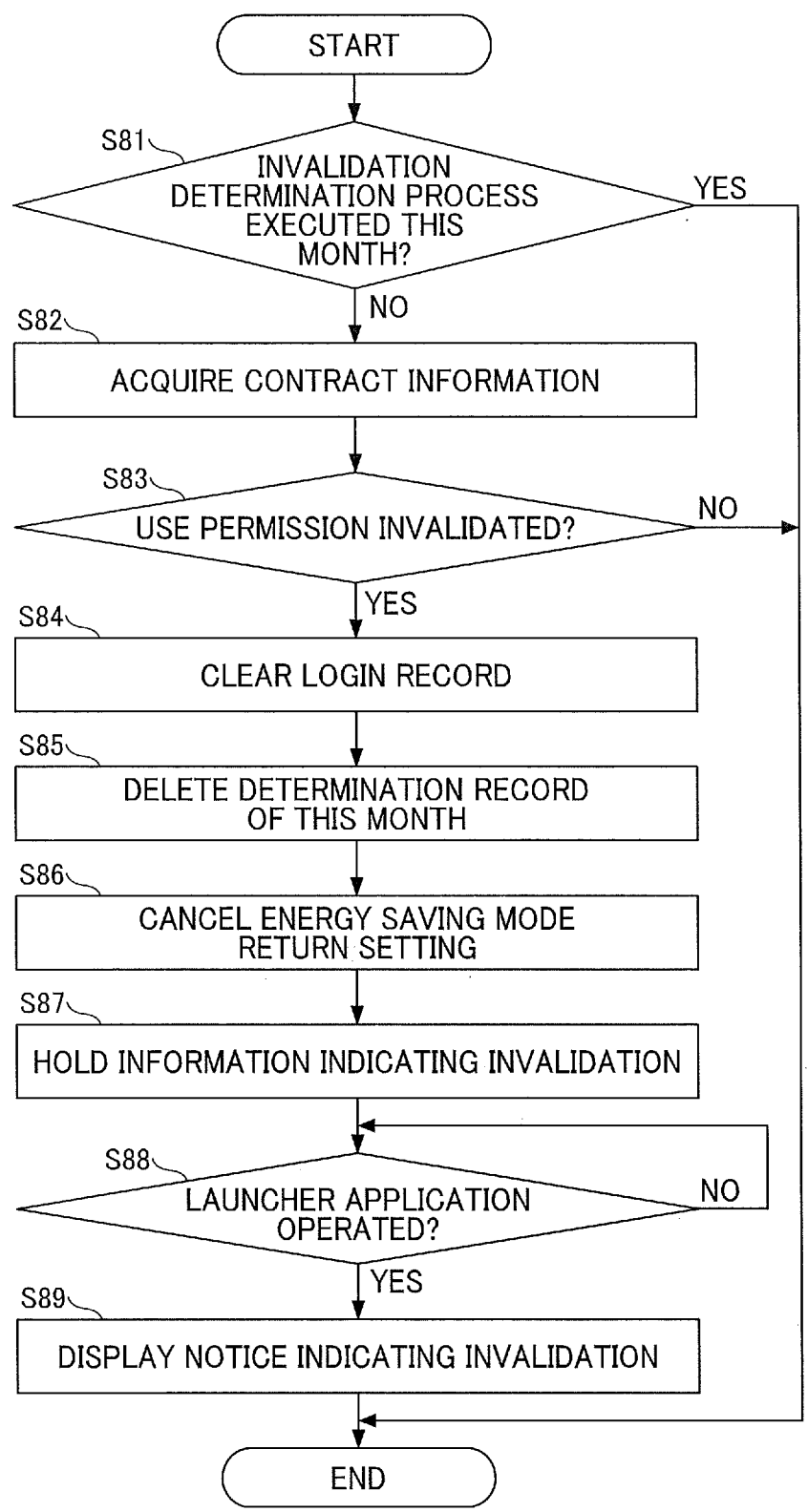
FIG. 8 is a flowchart illustrating an example of a process executed by the image forming apparatus according to a first embodiment of the present disclosure.

A process executed by the image forming apparatus 9 using each functional unit of FIG. 7 is described with reference to FIG. 8. FIG. 8 is a flowchart illustrating an example of the process executed by the image forming apparatus 9 according to a first embodiment. FIG. 8 illustrates a case where the determination unit 935 executes the invalidation determination process at night at the beginning of each month after the authentication by the authentication unit 934 was successful. FIG. 8 illustrates a process started when the energy saving mode return control unit 932 receives a return command from the energy saving mode from the image forming apparatus 9 at the return time.

In step S81, the determination unit 935 determines whether the invalidation determination process has been performed in the current month with reference to the determination record holding unit 94. The process of step S81 may be executed by the display control unit 93, the energy saving mode return control unit 932, the contract information acquisition unit 933, or the like.

When it is determined in step S81 that the invalidation determination process has been performed (Yes in step S81), the process ends here. On the other hand, when it is determined that the invalidation determination process has not been performed (No in step S81), the process proceeds to step S82.

In step S82, the contract information acquisition unit 933 transmits information indicating the package for which the contract information is to be acquired to the contract management server 5 through the data exchange unit 91. In response to the transmission of the information indicating the package, the contract information acquisition unit 933 acquires the contract information of the package transmitted by the contract management server 5 through the data exchange unit 91.

In step S83, the determination unit 935 compares the contract validity period included in the contract information of the package with the current date and time to determine whether the use permission is valid.

In response to a determination in step S83 that the use permission is valid (No in step S83), the process ends here. On the other hand, in response to a determination that the use permission is invalid (Yes in step S83), the process proceeds to step S84.

In step S84, the usage control unit 936 clears the information of the login record holding unit 95 and returns the application to the state before the successful authentication (before login). As a result, use of the application is rejected.

In step S85, the determination unit 935 deletes the information indicating that the invalidation determination process has been executed on the package in the current month from the determination record holding unit 94. The process of step S85 may be executed by the usage control unit 936 or the like.

In step S86, the display control unit 93 cancels the setting of the return command from the energy saving mode by the image forming apparatus 9 to disable the invalidation determination process.

In step S87, the display control unit 93 causes the invalidation information holding unit 96 to hold the information indicating the invalidation. The order of the processes of steps S84 to S87 may be changed as appropriate, or the processes may be executed in parallel.

In step S88, the display control unit 93 determines whether there has been an operation on the launcher application L.

In response to a determination in step S88 that there is no operation on the launcher application L (No in step S88), the process of step S88 is repeated. On the other hand, in response to a determination that there is an operation on the launcher application L (Yes in step S88), the process proceeds to step S89.

In step S89, the display control unit 93 causes the display unit 97 to display a notification indicating that the use permission is invalid. The display unit 97 displays the notification indicating that the use permission is invalid under the control of the display control unit 93.

In this way, when the use permission is invalid, the image forming apparatus 9 can disable the use of the application and display a notification indicating the invalidation.

Figure 9:
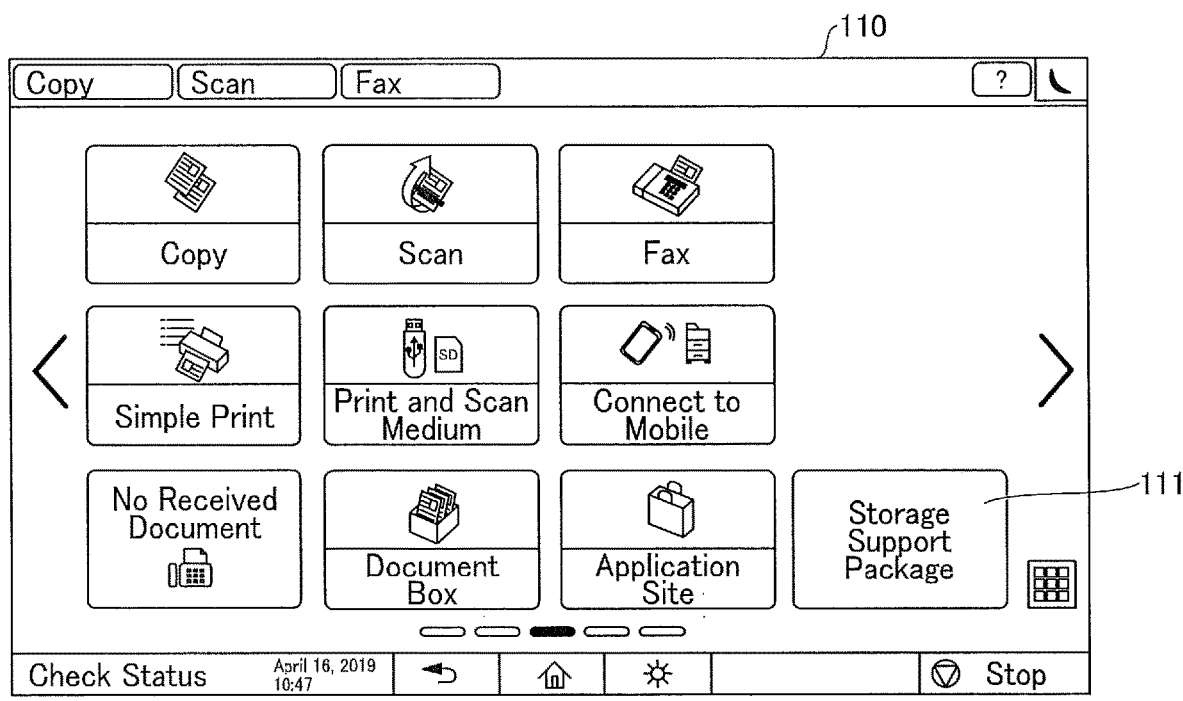
FIG. 9 is a diagram illustrating an example of an initial screen of a display unit according to embodiments of the present disclosure.

Various screen examples displayed by the display unit 97 of the image forming apparatus 9 is described with reference to FIGS. 9 to 11. FIG. 9 is a diagram illustrating an example of an initial screen 90 displayed by the display unit 97. The icon 111 in FIG. 9 is an icon for activating the launcher application L of the technical document storage support package for the manufacturing industry.

Figure 10A:
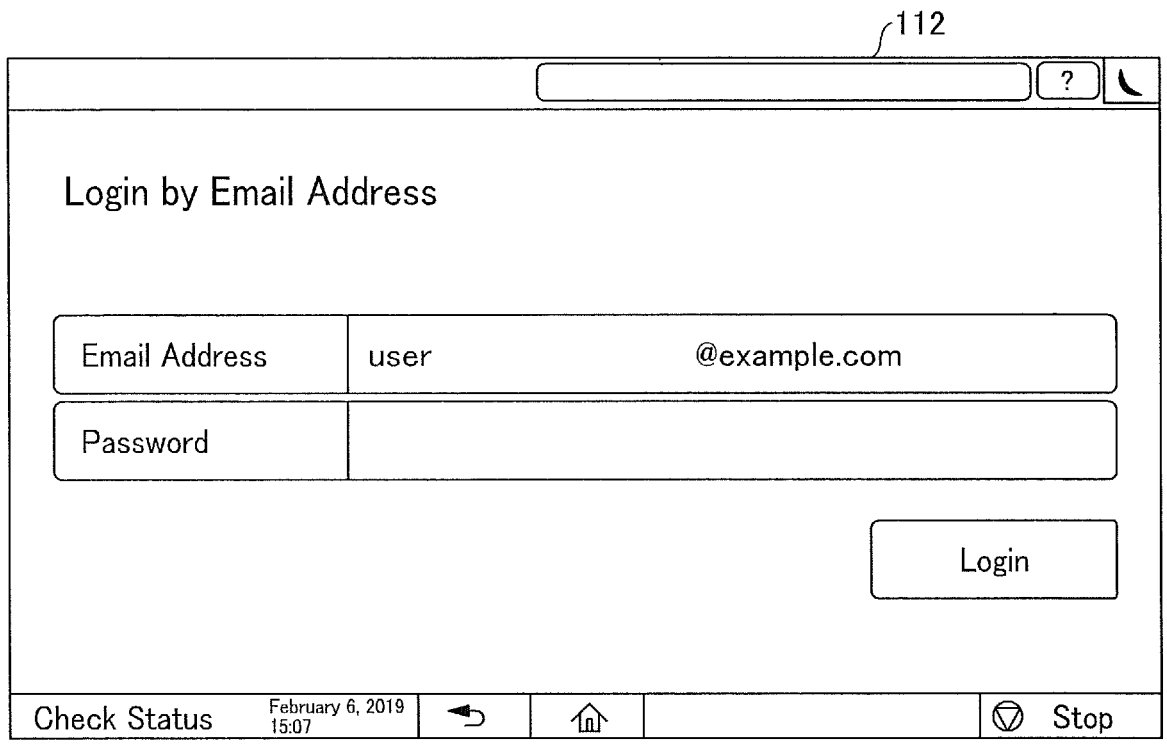
FIG. 10A is a diagram illustrating an example of a login screen according to embodiments of the present disclosure.
Figure 10B:
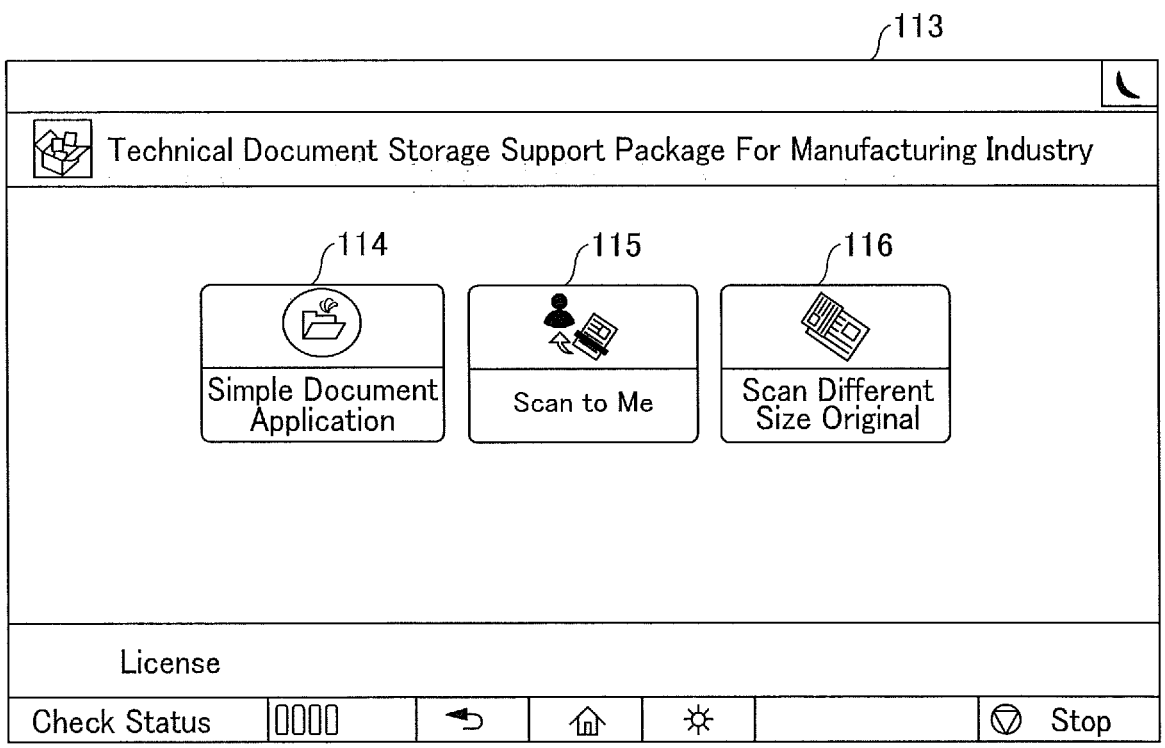
FIG. 10B is a diagram illustrating an example of a launcher screen according to embodiments of the present disclosure.

FIGS. 10A and 10B are diagrams illustrating an example of a screen when the launcher application L is started. FIG. 10A is a diagram illustrating an example of a login screen 112, and FIG. 10B is a diagram illustrating an example of a launcher screen 113. The login screen 112 is a screen displayed when the launcher application L included in the package is first started after the package is purchased. In response to a successful authentication result after entering the email address and password as authentication information, each application included in the package can be used. On the other hand, in response to an authentication failure, each application included in the package cannot be used. After the successful authentication result, the login screen 112 will not be displayed as long as the application use permission is valid.

The launcher screen 113 is a screen displayed after the successful authentication. The launcher screen 113 is displayed when the icon 111 for activating the launcher application L is operated after the authentication is successful. On the launcher screen 113, 114 is a simple document utilization application icon, 115 is a ScanToMe application icon, and 116 is a mixed size scan application icon. Each application can be executed by the operator touching each icon.

Figure 11:
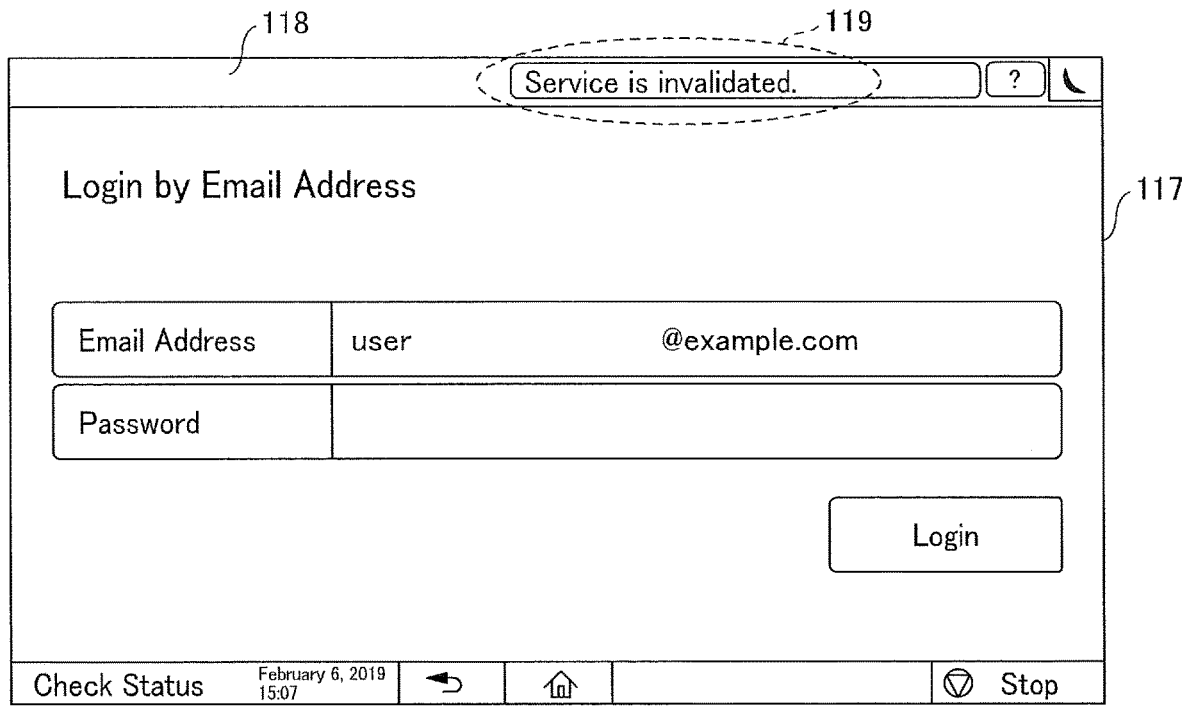
FIG. 11 is a diagram illustrating a display example of an invalidation notice according to the first embodiment of the present disclosure.

FIG. 11 is a diagram illustrating an example of an invalidation notice displayed according to the first embodiment. An invalidation notice screen 117 is a screen for displaying a notice indicating that the use permission is invalid, and is a screen displayed in step S89 in FIG. 8. The invalidation notice screen 117 is displayed when an operation on the launcher application L is made while the invalidation information holding unit 96 is temporarily holding the information indicating the invalidation by the invalidation determination process executed at night. The invalidation notice 119 is displayed on a banner 118 of the invalidation notice screen 117.

As described above, in the present embodiment, the screens of FIGS. 9 to 11 and the like are displayed.

The operation and effect of the image forming apparatus 9 according to the present embodiment is described.

For applications to which the use permission is granted in units of package, the login screen may be displayed for authentication at a certain time after purchasing the package and once authentication is successful, authentication may not be performed.

However, even after the successful authentication, the use permission may be invalidated due to expired contract period or insufficient monthly billing. In this case, since the authentication process is no longer performed, the application can be used even after the use permission is invalidated.

In such situation, if a technician or the like of the image forming apparatus is to visit a customer and perform uninstallation of the package, it will take time and effort. In addition, if the contract for the same package is re-concluded afterward, it will be necessary to reinstall the package, which will take more time and effort.

In the present embodiment, in an image forming apparatus (information processing apparatus) capable of executing a plurality of applications to which the use permission is granted in units of package, when the use permission is invalidated, a notification indicating the invalidation is displayed. By displaying and notifying the invalidation, it is possible to make the user or administrator of the image forming apparatus recognize the invalidation of the application. It becomes possible to prevent the invalidated application from being used and manage the use permission appropriately.

Further, in the present embodiment, in response to the invalidation of the use permission of a plurality of applications to which the use permission is granted in units of package, the use of the application is disabled. As a result, it becomes possible to prevent the invalidated application from being used.

Also, in the present embodiment, by providing the determination unit for determining whether the use permission is invalidated based on the contract information of the package, it is possible to automatically detect the invalidation of the application.

Further, in the present embodiment, by periodically determining whether the use permission is invalidated, it is possible to prevent overlooking the invalidation and prevent the use of the invalidated application.

Also, since the use of the image forming apparatus is restricted during the execution of the invalidation determination process, the user of the image forming apparatus may feel inconvenience. In the present embodiment, the invalidation determination process is executed during the night. Since the image forming apparatus is used infrequently at night, it is possible to reduce the inconvenience of the user and provide an easy-to-use image forming apparatus.

Further, in the present embodiment, when it is determined at night that the use permission is invalidated, a notification indicating the invalidation is displayed the next time the operation to the launcher application is received. As a result, even when the invalidation is detected at night, which is rarely seen by the user or the administrator of the image forming apparatus, the invalidation can be notified afterward.

Further, in the present embodiment, the launcher application (display control unit) included in the package determines whether the use permission has expired based on the contract information of the package. Since the launcher application has a function of displaying a launcher screen (home screen), it is highly probable that each package will be equipped as standard when a plurality of applications is provided for each package.

Therefore, since the launcher application includes functions to disable the use of the application when the use permission is invalidated and to display a notification indicating the invalidation, the image forming apparatus or the like does not have to include these functions separately from the package. As a result, labor, time, and cost can be reduced.

In the present embodiment, the information processing system that provides the application by a subscription method has been described, but the present disclosure is not limited to the subscription method. The present embodiment can also be applied to a method in which the fee is paid in a lump sum as long as the information processing system provides a plurality of applications to which the use permission is granted in units of package. For example, a validity period (contract period) of the application use permission is provided in advance, and when the use permission is invalidated after the validity period expires, the use permission can be appropriately managed by applying the present embodiment. However, in the subscription method, the use permission may be invalidated depending on the billing status, so the application of the present embodiment is preferable.

An image forming apparatus according to a second embodiment is described.

In the first embodiment, the invalidation determination process is executed at a certain time (return time), but if the power of the image forming apparatus 9 is off at that time, the invalidation determination process cannot be executed and the invalidation may not be detected in a timely manner. In particular, when the invalidation determination process is executed at night, there is a high possibility that the power of the image forming apparatus 9 is turned off and the invalidation may not be detected in a timely manner.

In the second embodiment, if the power of the image forming apparatus is turned off while determining whether the use permission is invalidated, the invalidation determination process is executed when the image forming apparatus is started at a predetermined time thereafter. The predetermined time is, for example, the time when the launcher application is started for the first time at the beginning of the month. By doing so, it is possible to detect the invalidation of the use permission of the application in a timely manner.

Figure 12:
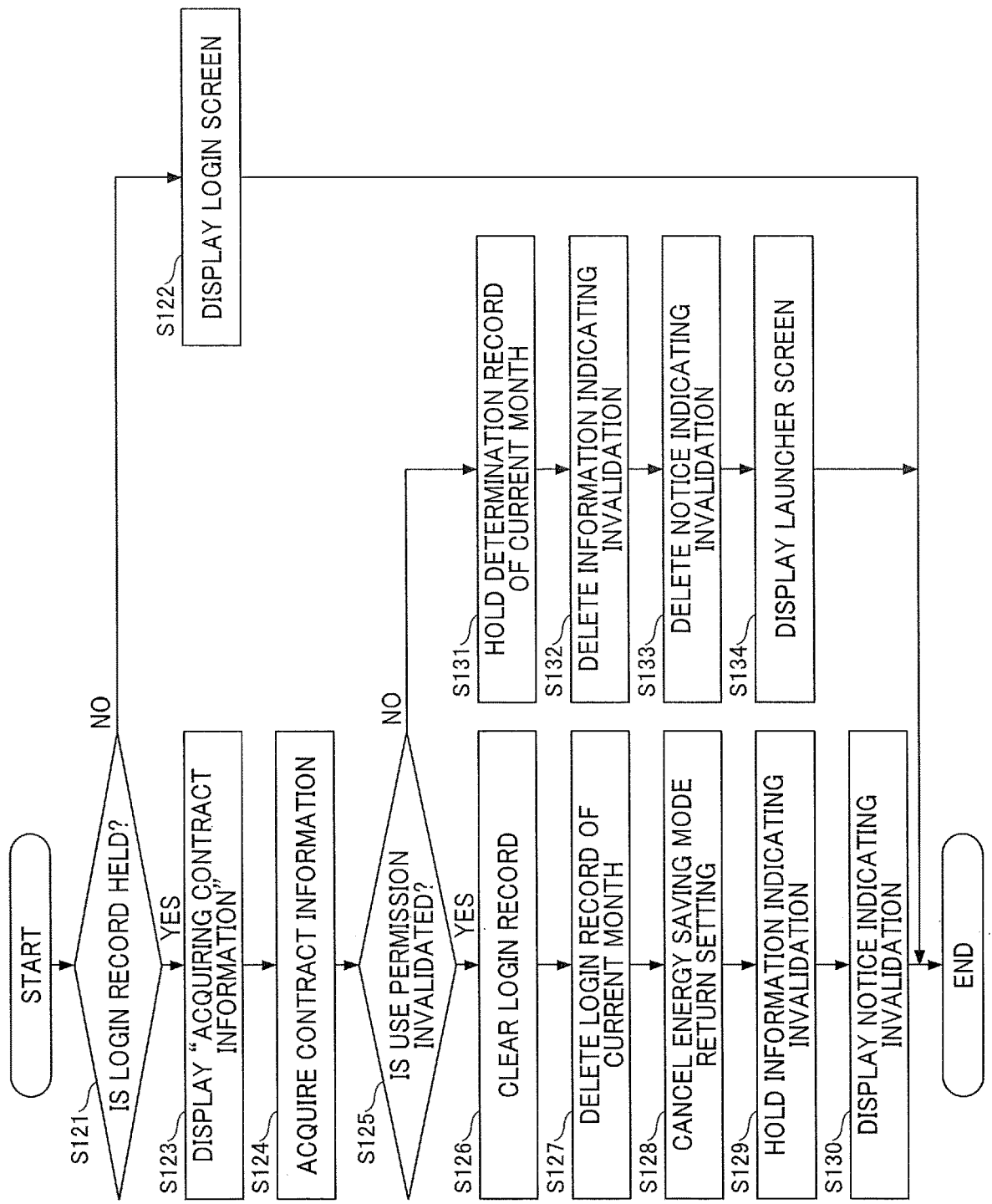
FIG. 12 is a flowchart illustrating an example of a process executed by the image forming apparatus according to a second embodiment of the present disclosure.

In the present embodiment, the functional unit included in the image forming apparatus is the same as that illustrated in FIG. 7, but the processing by the image forming apparatus is different. Therefore, the processing by the image forming apparatus is mainly described. FIG. 12 is a flowchart illustrating an example of a process executed by the image forming apparatus 9 according to the present embodiment. FIG. 12 illustrates the process started when the launcher application is started for the first time at the beginning of the month.

In step S121, the display control unit 93 refers to the login record holding unit 95 and determines whether a login record is held. The process of step S121 may be executed by the determination unit 935, the usage control unit 936, or the like.

In response to a determination in step S121 that the login record is not held (No in step S121), the display unit 97 displays the login screen under the control of the display control unit 93 in step S122, and the process ends. On the other hand, in response to a determination that the login record is held (Yes in step S121), the process proceeds to step S123.

In step S123, the display unit 97 displays a screen indicating "acquiring contract information" under the control of the display control unit 93.

In step S124, the contract information acquisition unit 933 transmits information indicating the package for which the contract information is to be acquired to the contract management server 5 through the data exchange unit 91. In response to the transmission of the information indicating the package, the contract information acquisition unit 933 acquires the contract information of the package transmitted by the contract management server 5 through the data exchange unit 91.

In step S125, the determination unit 935 compares the contract validity period included in the contract information of the package with the current date and time to determine whether the use permission is valid.

In response to a determination in step S125 that the use permission is invalid (Yes in step S125), the process proceeds to step S126.

In step S126, the usage control unit 936 returns to the state before the successful authentication (before login) by clearing the information held in the login record holding unit 95. As a result, the use of the applications included in the package is disabled.

In step S127, the determination unit 935 deletes the information held by the determination record holding unit 94 indicating that the invalidation determination process has been executed on the package in the current month. The process of step S127 may be executed by the usage control unit 936 or the like.

In step S128, the display control unit 93 cancels the setting of the return command from the energy saving mode by the image forming apparatus 9 to disable the invalidation determination process.

In step S129, the display control unit 93 causes the invalidation information holding unit 96 to hold information indicating the invalidation.

In step S130, the display control unit 93 causes the display unit 97 to display a notification indicating that the use permission is invalidated, and the display unit 97 displays a notification indicating that the use permission is invalidated under the control of the display control unit 93. The order of the steps S126 to S130 may be changed as appropriate, or the steps S126 to S130 may be executed in parallel.

On the other hand, in response to a determination in step S125 that the use permission is valid (No in step S125), the process proceeds to step S131.

In step S131, the determination unit 935 causes the determination record holding unit 94 to hold information indicating that the invalidation determination process has been executed on the package in the current month. The process of step S131 may be executed by the usage control unit 936 or the like.

In step S132, the display control unit 93 deletes the information held in the invalidation information holding unit 96 indicating the invalidation.

In step S133, the display control unit 93 causes the display unit 97 to delete the notification indicating that the use permission is invalidated, and the display unit 97 deletes the notification indicating that the use permission is invalidated from the display screen (display screen such as FIG. 11), under the control of the display control unit 93.

In step S134, the display control unit 93 causes the display unit 97 to display the launcher screen, and the display unit 97 displays the launcher screen under the control of the display control unit 93.

The process of steps S132 to S133 is a process performed when the use permission is invalidated before the process of FIG. 12 is started. If the use permission has not been invalidated before the process of FIG. 12 is started, the process of steps S132 to S133 is not executed.

In this way, even when the power of the image forming apparatus 9 is turned off while the image forming apparatus 9 is determining whether the use permission has been invalidated, the application can be disabled and a notice indicating that the use permission is invalidated can be displayed.

Figure 13:
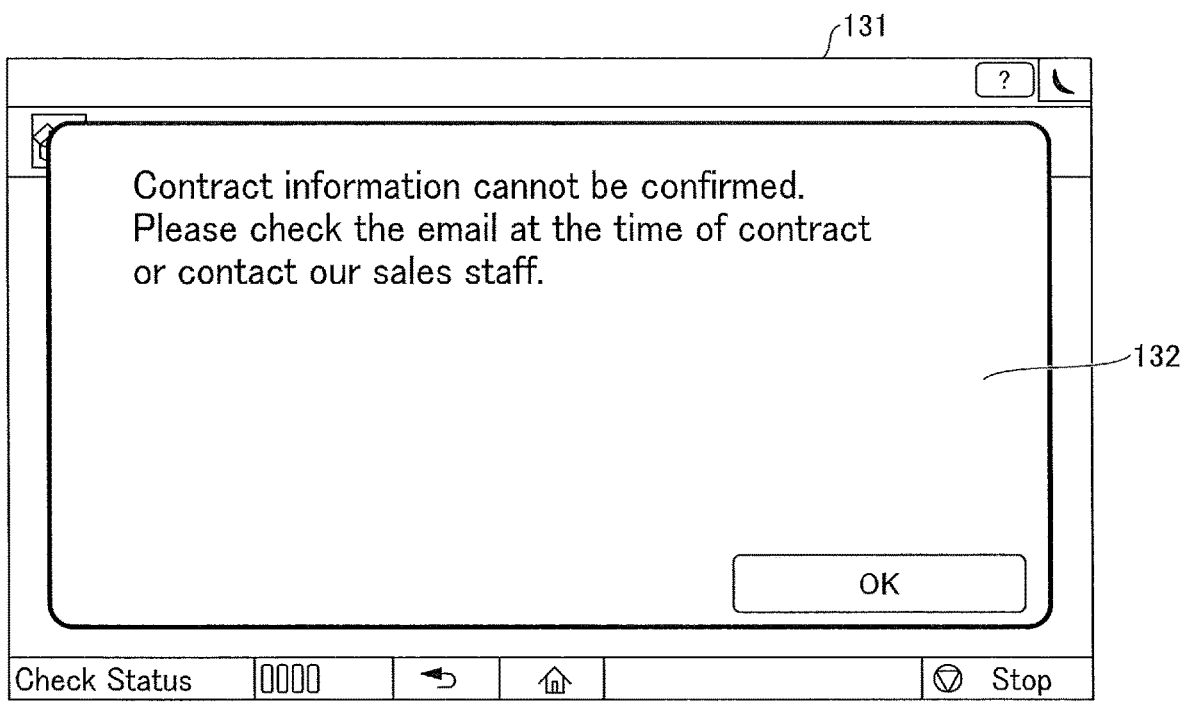
FIG. 13 is a diagram illustrating a display example of an invalidation notice according to the second embodiment of the present disclosure.

FIG. 13 is a diagram illustrating an example of an invalidation notice displayed in step S130 illustrated in FIG.

12 according to the present embodiment. As illustrated in FIG. 13, a notification display screen 131 displays a dialog 132 indicating that the contract information of the application cannot be confirmed. Accordingly, the invalidation of the use permission is notified to the user or administrator of the image forming apparatus 9. The notification display screen 131 is a screen that is also displayed when the authentication by the authentication unit 934 fails. By sharing the screen, it is possible to reduce the memory and the processing load.

As described above, in the present embodiment, when the power of the image forming apparatus is turned off while determining whether the use permission is invalidated, the invalidation determination process is executed when the image forming apparatus is started at a predetermined time such as the time when the launcher application is started for the first time at the beginning of the month. As a result, even when the power of the image forming apparatus 9 is off at the time when the invalidation determination process is executed, the invalidation of the application use permission can be detected. In the present embodiment, the time when the launcher application is started for the first time at the beginning of the month is described as the "predetermined time", but the present disclosure is not limited to this timing and can be appropriately selected. The effects other than the above-mentioned effects are the same as those described in the first embodiment.

The embodiment also includes an information processing method. For example, the information processing method is an information processing method by an information processing apparatus capable of executing a plurality of applications to which the use permission is granted in units of package, and when the use permission is invalidated, performs the step of displaying the notification indicating invalidation. By such an information processing method, the same effect as that of the image forming apparatus described above can be obtained.

The embodiment also includes a program. For example, the program causes the information processing apparatus to execute a process of displaying a notification indicating the invalidation of the use permission when the use permission is invalidated in a plurality of applications to which the use permission is granted in units of package. With such a program, the same effect as that of the image forming apparatus described above can be obtained.

In addition, the numbers such as the ordinal number and the quantity used above are all examples for concretely explaining the technique of the present disclosure, and the present disclosure is not limited to the illustrated numbers. Further, the connection relationship between the constituent elements is exemplified for concretely explaining the technique of the present disclosure, and the connection relationship for implementing the function of the present disclosure is not limited to the above description.

Further, the division of blocks in the functional block diagram is an example, and even a plurality of blocks may be implemented as one block, one block may be divided into a plurality of blocks, and/or some functions may be transferred to another block. In addition, functions of a plurality of blocks having similar functions may be processed by a single piece of hardware or software in parallel or in a time division manner.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An information processing apparatus comprising circuitry configured to:
execute at least one of a plurality of applications for which use permission is granted in units of package; and
in response to an invalidation of the use permission, display on a display, a notification indicating the invalidation of the use permission,
wherein the circuitry is further configured to:
display a list of the plurality of applications on the display;
determine whether the use permission is invalidated based on contract information of a package including the plurality of applications;
control to delete information indicating that a user has been logged in to the package, thereby disabling the use of the plurality of applications when the use permission is invalidated; and
display on the display, a notification indicating the invalidation of the use permission when the use permission is invalidated.

2. The information processing apparatus of claim 1, wherein
the circuitry is further configured to disable the usage of the plurality of applications in response to the invalidation of the use permission.

3. The information processing apparatus of claim 1, wherein
the circuitry is further configured to determine whether the use permission is invalidated based on contract information of a package including the plurality of applications.

4. The information processing apparatus of claim 3, wherein
the circuitry is configured to periodically determine whether the use permission is invalidated.

5. The information processing apparatus of claim 4, wherein
when power of the information processing apparatus is turned off at a time when the circuitry is scheduled to determine whether the use permission is invalidated, the circuitry is configured to determine whether the use permission is invalidated in response to a startup of the information processing apparatus.

6. The information processing apparatus of claim 3, wherein
the circuitry is configured to determine whether the use permission is invalidated at night.

7. The information processing apparatus of claim 6, wherein
when a determination is made at night that the use permission is invalidated, the circuitry is configured to display on the display a notification indicating the invalidation of the use permission in response to an operation for displaying a list of the plurality of applications.

8. An information processing system comprising:
the information processing apparatus of claim 3; and
a management apparatus configured to store contract information of the package including the plurality of applications.

9. An information processing system comprising:
circuitry configured to:
execute at least one of a plurality of applications for which use permission is granted in units of package, and
in response to an invalidation of the use permission, display on a display, a notification indicating the invalidation of the use permission
wherein the circuitry is further configured to:
display a list of the plurality of applications on the display;
determine whether the use permission is invalidated based on contract information of a package including the plurality of applications;
control to delete information indicating that a user has been logged in to the package, thereby disabling the use of the plurality of applications when the use permission is invalidated; and
display on the display, a notification indicating the invalidation of the use permission when the use permission is invalidated.

10. The information processing system of claim 9, further comprising:
a memory that stores contract information for a plurality of packages; and
the circuitry being configured to determine whether the use permission is invalidated based on the contract information of a particular package including the plurality of applications.

11. An information processing method, performed by an information processing apparatus configured to execute at least one of a plurality of applications for which use permission is granted in units of package, the method comprising:
in response to an invalidation of the use permission granted to a package including the plurality of applications, displaying on a display, a notification indicating the invalidation of the use permission,
displaying a list of the plurality of applications on the display;
determining whether the use permission is invalidated based on contract information of a package including the plurality of applications;
controlling to delete information indicating that a user has been logged in to the package, thereby disabling the use of the plurality of applications when the use permission is invalidated; and
displaying on the display, a notification indicating the invalidation of the use permission when the use permission is invalidated.

* * * * *